United States Patent
Taneja et al.

(10) Patent No.: US 10,440,619 B2
(45) Date of Patent: Oct. 8, 2019

(54) SYSTEM AND METHOD FOR SEAMLESS MOBILITY IN A NETWORK ENVIRONMENT

(71) Applicant: CISCO TECHNOLOGY, INC., San Jose, CA (US)

(72) Inventors: Mukesh Taneja, Bangalore (IN); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 15/222,465

(22) Filed: Jul. 28, 2016

(65) Prior Publication Data

US 2016/0337912 A1 Nov. 17, 2016

Related U.S. Application Data

(63) Continuation of application No. 14/175,674, filed on Feb. 7, 2014, now Pat. No. 9,763,147, which is a (Continued)

(51) Int. Cl.
*H04W 4/00* (2018.01)
*H04W 36/00* (2009.01)
(Continued)

(52) U.S. Cl.
CPC ...... *H04W 36/0066* (2013.01); *H04B 17/318* (2015.01); *H04L 63/029* (2013.01);
(Continued)

(58) Field of Classification Search
USPC ....... 370/229, 235, 236, 252, 328, 331, 332; 455/436
See application file for complete search history.

(56) References Cited

U.S. PATENT DOCUMENTS 8,462,731 B2 * 6/2013 Lee ............... H04W 48/20
370/329
9,420,503 B2 8/2016 Taneja et al.
(Continued)

FOREIGN PATENT DOCUMENTS

CN 104796954 A 7/2015
CN 104796955 A 7/2015
(Continued)

OTHER PUBLICATIONS

3GPP TS 24.234 V11.3.0 (Jun. 2012) Technical Specification: 3rd Generation Partnership Project: Group Core Network and Terminals; 3GPP System to Wireless Local Area Network (WLAN) interworking; WLAN User Equipment (WLAN UE) to network protocols; Stage 3 (Release 11); 650 Route des Lucioles—Sophia Antipolis Valbonne—France; Jul. 2012; 41 pages.
(Continued)

*Primary Examiner* — Kwang B Yao
*Assistant Examiner* — Nguyen H Ngo
(74) *Attorney, Agent, or Firm* — Patterson + Sheridan, LLP

(57) ABSTRACT

In one example embodiment, an apparatus is provided that includes an antenna that receives, in a first wireless network, a first identifier of a second wireless network access point. The apparatus also includes a processor that processes data received by the antenna. The apparatus transmits, in the first wireless network, the first identifier of the second wireless network access point. The apparatus establishes a tunnel to the second wireless network. The antenna transmits a second identifier of the second wireless network access point.

18 Claims, 11 Drawing Sheets

US 10,440,619 B2
Page 2

Related U.S. Application Data continuation of application No. 14/160,127, filed on Jan. 21, 2014, now Pat. No. 9,420,503.

(51) Int. Cl.
| | |
|---|---|
| *H04W 12/06* | (2009.01) |
| *H04B 17/318* | (2015.01) |
| *H04L 29/06* | (2006.01) |
| *H04W 36/14* | (2009.01) |
| *H04W 88/06* | (2009.01) |
| *H04W 84/12* | (2009.01) |
| *H04W 84/04* | (2009.01) |

(52) U.S. Cl.
CPC ............ *H04L 63/08* (2013.01); *H04W 12/06* (2013.01); *H04W 36/0044* (2013.01); *H04W 36/0061* (2013.01); *H04W 36/14* (2013.01); *H04L 63/0272* (2013.01); *H04W 84/042* (2013.01); *H04W 84/12* (2013.01); *H04W 88/06* (2013.01)

(56) References Cited

U.S. PATENT DOCUMENTS

| | | | |
|---|---|---|---|
| 9,763,147 | B2 | 9/2017 | Taneja et al. |
| 2006/0200543 | A1 | 9/2006 | Kong |
| 2006/0215607 | A1 | 9/2006 | Mitchel |
| 2006/0268802 | A1 | 11/2006 | Faccin |
| 2007/0133467 | A1 | 6/2007 | Hsu |
| 2007/0160049 | A1 | 7/2007 | Xie et al. |
| 2007/0207806 | A1 | 9/2007 | Shaheen |
| 2007/0249352 | A1* | 10/2007 | Song ........................ H04L 63/08 455/436 |
| 2008/0064401 | A1* | 3/2008 | Forssell ................ H04W 36/04 455/436 |
| 2008/0189970 | A1 | 8/2008 | Wang et al. |
| 2008/0205445 | A1 | 8/2008 | Kumar |
| 2008/0316970 | A1 | 12/2008 | Choi |
| 2009/0022104 | A1 | 1/2009 | Cherian et al. |
| 2009/0131053 | A1 | 5/2009 | Sachs |
| 2009/0156213 | A1 | 6/2009 | Spinelli |
| 2010/0190500 | A1 | 7/2010 | Choi et al. |
| 2010/0291933 | A1 | 11/2010 | Choi et al. |
| 2010/0323700 | A1* | 12/2010 | Bachmann ........ H04W 36/0066 455/436 |
| 2011/0019609 | A1 | 1/2011 | Zhong et al. |
| 2011/0122845 | A1 | 5/2011 | Meirosu et al. |
| 2013/0039337 | A1* | 2/2013 | Hwang ............. H04W 36/0066 370/331 |
| 2013/0080597 | A1* | 3/2013 | Liao ...................... H04W 4/005 709/219 |
| 2014/0011519 | A1* | 1/2014 | Lee .......................... H04W 8/24 455/456.1 |
| 2014/0029513 | A1 | 1/2014 | Takahashi |
| 2014/0051442 | A1 | 2/2014 | Yang et al. |
| 2014/0071925 | A1 | 3/2014 | Liu |
| 2014/0086211 | A1 | 3/2014 | Liu |
| 2014/0161103 | A1* | 6/2014 | Sirotkin ................ H04W 24/10 370/332 |
| 2014/0204927 | A1 | 7/2014 | Horn et al. |
| 2014/0213219 | A1 | 7/2014 | Mohebbi |
| 2014/0233386 | A1 | 8/2014 | Jamadagni et al. |
| 2014/0293959 | A1 | 10/2014 | Singh |
| 2014/0328246 | A1 | 11/2014 | Ku |
| 2015/0003435 | A1 | 1/2015 | Horn et al. |
| 2015/0016282 | A1* | 1/2015 | Su ...................... H04W 36/0088 370/252 |
| 2015/0165800 | A1 | 6/2015 | Silverbrook et al. |
| 2015/0195800 | A1 | 7/2015 | Zhu |
| 2015/0208309 | A1 | 7/2015 | Taneja et al. |
| 2015/0208310 | A1 | 7/2015 | Taneja et al. |
| 2015/0365984 | A1* | 12/2015 | Lee ........................ H04W 76/02 370/329 |
| 2015/0378125 | A1* | 12/2015 | Sales Casals ........ H01R 13/523 385/56 |
| 2016/0192177 | A1 | 6/2016 | Kim |
| 2016/0264124 | A1* | 9/2016 | Hotta ..................... B60K 6/445 |
| 2016/0269985 | A1* | 9/2016 | Bergstrom ............ H04W 76/10 |

FOREIGN PATENT DOCUMENTS

| | | |
|---|---|---|
| EP | 2925055 | 9/2015 |
| WO | WO2011/043772 | 4/2011 |
| WO | 2013068787 A1 | 5/2013 |
| WO | 2013143610 A1 | 10/2013 |
| WO | WO2013/143610 | 10/2013 |

OTHER PUBLICATIONS

ETSI TS 136 331 V9.14.1 (Apr. 2013) Technical Specification: LTE; Evolved Universal Terrestrial Radio Access (E-UTRA); Radio Resource Control (RRC); Protocol specification (3GPP TS 36.331 version 9.14.1 Release 9); Apr. 2013; 650 Route des Lucioles, F-06921 Sophia Antipolis Cedex—France; 266 pages.

3GPP TSG-RAN WG2 #81 R2-130503 St. Julian's, Malta, Jan. 28-Feb. 1, 2013, LG Electronics, Inc.: "3GPP-WLAN interworking," 3GPP Draft; RS-130503 Work Scopes and Target Scenarios of 3GPP WLAN RAN Interworking, 3$^{rd}$ Generation Partnership Project, Mobile Competence Centre; 650 Route Des Lucioles; F-06921, RAN WG2; http://www.3gpp.org/ftp/tsg_ran/WG2_RL2/TSGR2_8a/Docs/.

"3GPP TS-23.402 V9.5.0 (Jun. 2010) Technical Specification: 3$^{rd}$ Generation Partnership Project; Technical Specification Group Services and System Aspects; Architecture enhancements for non-3GPP accesses (Release 9)," 3$^{rd}$ Generation Partnership Project, Jun. 2010, 200 pages.

"3GPP TS-43.318 V8.4.0 (Feb. 2009) Technical Specification: 3$^{rd}$ Generation Partnership Project; Technical Specification Group GSM/EDGE Radio Access Network; Generic Access Network (GAN); Stage 2 (Release 8)," 3$^{rd}$ Generation Partnership Project, Feb. 2009, 127 pages.

"3GPP TS 23.234 V10.0.0 (Mar. 2011) Technical Specification: 3$^{rd}$ Generation Partnership Project; Technical Specification Group Services and System Aspects; 3GPP system to Wireless Local Area Network (WLAN) interworking; System description (Release 10)," 3$^{rd}$ Generation Partnership Project, Mar. 2011, 84 pages.

3GPP TSG-RAN WG2 #81 R2-130503; St. Julian's, Malta, Jan. 28-Feb. 1, 2013, LG Electronics, Inc.: "3GPP-WLAN interworking," 3GPP Draft; RS-130503 Work Scopes and Target Scenarios of 3GPP WLAN RAN Interworking, 3$^{rd}$ Generation Partnership Project, Mobile Competence Centre; 650 Route Des Lucioles; F-06921, RAN WG2; http://www.3gpp.org/ftp/tsh_ran/WG2_RL2/TSGR2_8a/Docs/.

"ETSI TS 136-401 V8.6.0 (Jul. 2009) Technical Specification: LTE; Evolved Universal Terrestrial Radio Access Network (E-UTRAN); Architecture description (3GPP TS 36.401 version 8.6.0 Release 8)," European Telecommunications Standards Institute, France, Jul. 2009; 21 pages.

"ETSI TS 136-413 V8.6.1 (Jul. 2009) Technical Specification: LTE; Evolved Universal Terrestrial Radio Access (E-UTRA); S1 Application Protocol (S1AP) (#GPP TS 36.413 version 8.6.1 Release 8)," European Telecommunications Standards Institute, France, Jul. 2009; 218 pages.

"ETSI TS 136-300 V10.5.0 (Nov. 2011) : LTE; Evolved Universal Terrestrial Radio Access (E-UTRA) and Evolved Universal Terrestrial Radio Access Network (E-UTRAN); Overall description; Stage 2 (3GPP TS 36.300 version 10.5.0 Release 10)," European Telecommunications Standards Institute, France, Nov. 2011, 208 pages.

"3GPP TS-36.331 V9.3.0 (Jun. 2010) Technical Specification: 3$^{rd}$ Generation Partnership Project; Technical Specification Group Radio Access Network; Evolved Universal Terrestrial Radio Access (E-UTRA); Radio Resource Control (RRC); Protocol specification (Release 9)," 3$^{rd}$ Generation Partnership Project, Jun. 2010, 250 pages.

(56) References Cited

OTHER PUBLICATIONS

"3GPP TS-23.401 V10.7.0 (Mar. 2012) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)," $3^{rd}$ Generation Partnership Project, Mar. 2012, 278 pages.
CN Office Action dated May 16, 2018 for Application No. 20150028819.3.
USPTO Apr. 22, 2016 Notice of Allowance from U.S. Appl. No. 14/160,127.
U.S. Appl. No. 15/222,465, filed Jul. 28, 2016, entitled "System and Method for Seamless Mobility in a Network Environment," Inventors Mukesh Taneja, et al.
EPO Sep. 2, 2015 Search Report and Written Opinion from European Application EP15151524.
3GPP TS 24.234 VII.3.0 (Jun. 2012) Technical Specification: 3rd Generation Partnership Project: Group Core Network and Terminals; 3GPP System to Wireless Local Area Network (WLAN) interworking; WLAN User Equipment (WLAN UE) to network protocols; Stage 3 (Release 11); 650 Route des Lucioles—Sophia Antipolis Valbonne—France; Jul. 2012;41 pages.
"ETSI TS 136-300 VI0.6.0 (Nov. 11) : LTE; Evolved Universal Terrestrial Radio Access (E-UTRA) and Evolved Universal Terrestrial Radio Access Network (E-UTRAN); Overall description; Stage 2 (3GPP TS 36.300 version 10.5.0 Release 10)," European Telecommunications Standards Institute, France, Nov. 2011, 208 pages.
U.S. Appl. No. 14/160,127, filed Jan. 21, 2014, entitled "System and Method for Seamless Mobility in a Network Environment," Inventors Mukesh Taneja, et al.
ETIS TS 136 331 V9.14.1 (Apr. 2013) Technical Specification: LTD; Evolved Universal Terrestrial Radio Access (E-UTRA); Radio Resource Control (RRC); Protocol specification (3GPP TS 36.331 version 9.14.1 Release 9); Apr. 2013; 650 Route des Lucioles, F-06921 Sophia Antipolis Ced ex—France; 266 pages.

\* cited by examiner

|                                   | ORDER 1 (TIMESTAMP)                                                                |
| --------------------------------- | ---------------------------------------------------------------------------------- |
|                                   | ORDER 2 (BEACON INTERVAL)                                                          |
|                                   | ○ ○ ○                                                                              |
|                                   | ORDER 24 - QoS CAPABILITY                                                          |
| VENDOR SPECIFIC EXTENSIONS        | LOCATION OF WLAN AP (CONFIGURED AT AP OR OBTAINED VIA GPS IF AVAILABLE AT AP)      |
|                                   | MAC ADDRESS OF WLAN AP, IF DIFFERENT FROM BSSID USED IN 802.11 FRAME               |
| VENDOR SPECIFIC EXTENSIONS - OPTIONAL FIELDS | IP ADDRESS OF WLAN AGW (IF CONFIGURED AT AP, OR IP ADDRESS OF A DEFAULT AP) |
|                                   | OPTIONAL - IP/MAC ADDRESS(ES) OF WLC(S)                                            |

FIG. 4

|                                   | ORDER 1 (TIMESTAMP)                                                                |
| --------------------------------- | ---------------------------------------------------------------------------------- |
|                                   | ORDER 2 (BEACON INTERVAL)                                                          |
|                                   | ○ ○ ○                                                                              |
|                                   | ORDER 22 - EDCA PARAMETER SET                                                      |
| VENDOR SPECIFIC EXTENSIONS        | LOCATION OF WLAN AP (CONFIGURED AT AP OR OBTAINED VIA GPS IF AVAILABLE AT AP)      |
|                                   | MAC ADDRESS OF WLAN AP, IF DIFFERENT FROM BSSID USED IN 802.11 FRAME               |
| VENDOR SPECIFIC EXTENSIONS - OPTIONAL FIELDS | IP ADDRESS OF WLAN AGW (IF CONFIGURED AT AP, OR IP ADDRESS OF A DEFAULT AP) - OPTIONAL FIELD |
|                                   | IP/MAC ADDRESS(ES) OF WLC(S) - OPTIONAL                                            |
|                                   | REQUESTED INFORMATION ELEMENTS                                                     |

FIG. 5

| TYPE | TYPE DESCRIPTION | SUBTYPE | SUBTYPE DESCRIPTION |
|---|---|---|---|
| 01 | CONTROL | 0000 | WLAN → LTE HANDOVER REQUEST MESSAGE. SENT FROM UE TO WLAN AP (TO CONVEY SIGNAL STRENGTH OF LTE eNodeB, LOCATION OF UE, LTE eNodeB ID, LTE UE ID) |
| 01 | CONTROL | 0001 | ACK |
| 01 | CONTROL | 0010 | WLAN → LTE HANDOVER CONFIRM MESSAGE SENT FROM WLAN AP TO UE |

US 10,440,619 B2

SYSTEM AND METHOD FOR SEAMLESS MOBILITY IN A NETWORK ENVIRONMENT

RELATED APPLICATION

This Application is a continuation (and claims the benefit of priority under 35 U.S.C. § 120) of U.S. application Ser. No. 14/175,674, filed on Feb. 7, 2014, entitled "SYSTEM AND METHOD FOR SEAMLESS MOBILITY IN A NETWORK ENVIRONMENT," Inventors Mukesh Taneja, et al., which Application is a continuation (and claims the benefit of priority under 35 U.S.C. § 120) of U.S. application Ser. No. 14/160,127, filed Jan. 21, 2014, entitled "SYSTEM AND METHOD FOR SEAMLESS MOBILITY IN A NETWORK ENVIRONMENT," Inventors Mukesh Taneja, et al. The disclosure of the prior applications are considered part of (and are incorporated by reference in) the disclosure of this application.

TECHNICAL FIELD

This disclosure relates in general to the field of telecommunications and, more particularly, to providing seamless mobility in a network environment.

BACKGROUND

Some wireless products are based on the Institute of Electrical and Electronics Engineers' (IEEE) 802.11 standards (WiFi), whereas others use a cellular network. There have been many activities in the cellular-Wi-Fi integration area in the past few years. Cellular (e.g., Long Term Evolution [LTE]/3G) and WiFi networks can be integrated via a loose coupling or a tighter coupling. Some work has offered mechanisms that consider a loose coupling of LTE and WiFi networks. Proxy MIPv6 is an example in which a loose coupling of LTE and Wi-Fi networks is considered. There is an interest to move towards a tighter coupling network architectures, as these architectures can provide a more seamless mobility experience to users. For example, some companies have proposed to include tighter coupling of LTE-WiFi networks for 3GPP Release 12.

There are many constraints in supporting dual mode LTE-WiFi User Equipment (UE) (e.g., a handset). One constraint is that the cost of the handset goes up: for example, supporting two RF chips increases the cost of device. There are also interference issues that need to be tackled when LTE as well as WiFi RF are active on the same device, especially if they are on similar RF frequencies (e.g., 2.4 GHz/2.3 GHz). There are also battery issues when two RF chains are active simultaneously, and one is communicating data over two radio access technologies. There are devices that support two RF chips (one for cellular and one for Wi-Fi), but only one is active at a time due to these issues. On the other end, there are more expensive devices that support two active RF chips, but that support is typically for select spectrum bands only.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 illustrates an example of an enhanced beacon that can be received by the UE from the WLAN AP at S210;

FIG. 5 illustrates an example of an enhanced probe response that can be received by the UE from the WLAN AP at S210;

DETAILED DESCRIPTION OF EXAMPLE EMBODIMENTS

Overview

Figure 1:
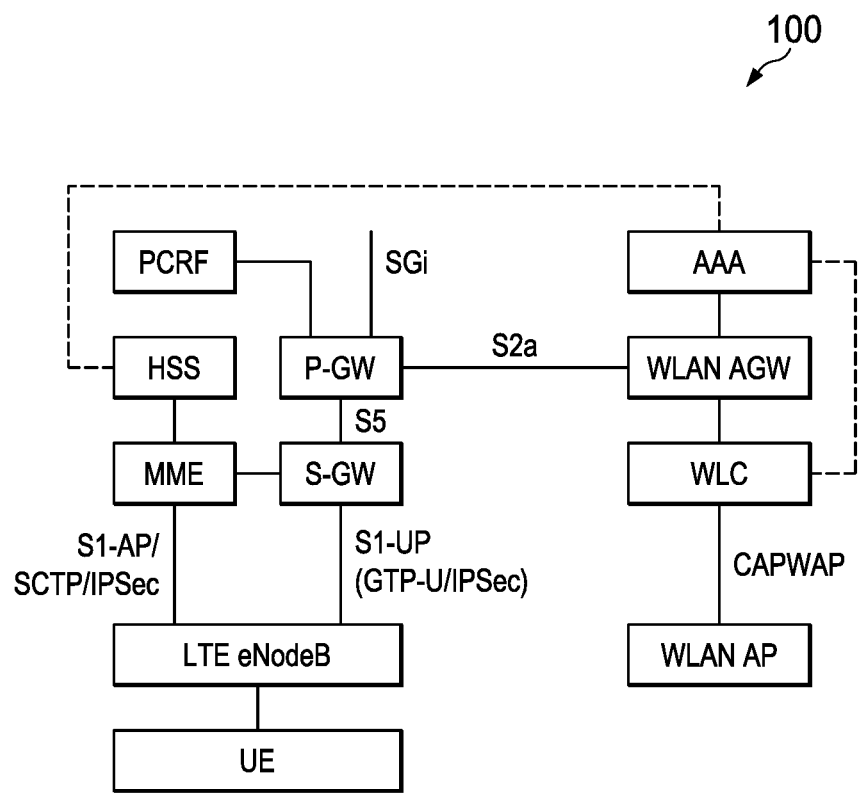
FIG. 1 illustrates a system architecture in which a long-term evolution (LTE)→wireless local area network (WLAN) handover can be implemented.

In one example, an apparatus is provided that includes an antenna configured to receive, in a first wireless network, an identifier of a second wireless network access point; and a processor configured to process data received by the antenna. The apparatus is configured to transmit the first identifier of the second wireless network access point; and establish a tunnel to the second wireless network, where the antenna is configured to transmit a second identifier of the second wireless network access point.

In other more specific embodiments, the antenna is configured to transmit an identification of a scheduling gap, and the antenna is configured to receive a signal strength of a signal from the second wireless network access point during the scheduling gap. In yet other embodiments, the apparatus is configured to receive an internet protocol address of a device in the second wireless network, and the tunnel is established to the device in the second wireless network. The apparatus can be configured to perform an association for the second wireless network in the first wireless network. The apparatus can also be configured to perform an authentication for the second wireless network in the first wireless network. In yet other examples, the apparatus is configured to transmit the second identifier of the second wireless network access point over the tunnel. Additionally, the apparatus is configured to forward buffered data to the second wireless network after transmitting the second identifier in the first wireless network.

Example Embodiments

Example Implementations Involving LTE→WLAN Handover

Embodiments provide mobility methods for a seamless handover between, for example, long-term evolution (LTE) and wireless local area network (WLAN) networks. Some embodiments provide methods that work when there is only one active radio frequency (RF) chip at a time in a user device (e.g., tunable RF to cover two radio access technologies (RATs)). A method is also specified for the case where a device (e.g., user equipment (UE)) can communicate with the LTE network, as well as the WLAN network simultaneously. Embodiments can include a mobility method for a device with two RF chips but only active chip at a time, and a mobility method for a device with two RF chips where both can be used simultaneously for control information but only one is used for data communication. Some methods also establish an IPsec tunnel from the UE to do the handover, though an IPsec tunnel from the UE is not established in some cases.

Methods provided herein can help to achieve a make-before-break handover, as a dual mode LTE-WLAN UE is allowed to carry out mechanisms such as a selection of a suitable WLAN AP for a handover from an LTE eNodeB to a WLAN AP, assisting an LTE network in identifying a WLAN Access Gateway (AGW) that is acting as a WLAN AGW for the selected WLAN AP, an association with the WLAN AP, and an authentication for a WLAN network while the UE continues to communicate data with the LTE network. Unlike other methods, closer integration of the LTE and the WLAN networks is made feasible by providing a logical interface tunnel between a MME (mobility management entity of an LTE core network, Evolved Packet Core [EPC]) and a WLAN AGW. Methods are specified so that even devices with only one active RF at a time (i.e., either an LTE RF or a WLAN RF is active at a time but not both simultaneously) can achieve a make-before-break handover.

A make-before-break handover method is also provided for a WLAN→LTE handover. For preparing for such a handover, no IPsec tunnel needs to be established from the user equipment, and IEEE 802.11 MAC messages, CAPWAP, and S1-AP protocol messages can be enhanced to carry handover messages. Several initial LTE related operations are completed during initial handover preparation.

FIG. 1 illustrates an example system architecture 100 to which an embodiment for handing over from an LTE network to a WLAN network can be applied. In the illustrated embodiment, the system can include a PDN Gateway (P-GW) connected to a Policy and Charging Rules Function (PCRF), an SGi interface, an S2a interface, and an S5 interface (as per 3GPP T523.402). The P-GW connects to a WLAN AGW by the S2a interface and connects to an S-GW node by the S5 interface. The S-GW node is connected to a MME and an LTE eNodeB. The eNodeB is, for example, an LTE base station. The MME is connected to a Home Subscriber Server (HSS) connected to Authentication, Authorization, and Accounting (AAA). The WLAN AGW is connected to the AAA, as well as a Wireless LAN Controller (WLC) and a WLAN access point (AP). In one scenario, communication is performed WLAN AGW-WLC-WLAN AP. In another scenario, communication is performed WLAN AGW-WLAN AP.

Figure 2A:
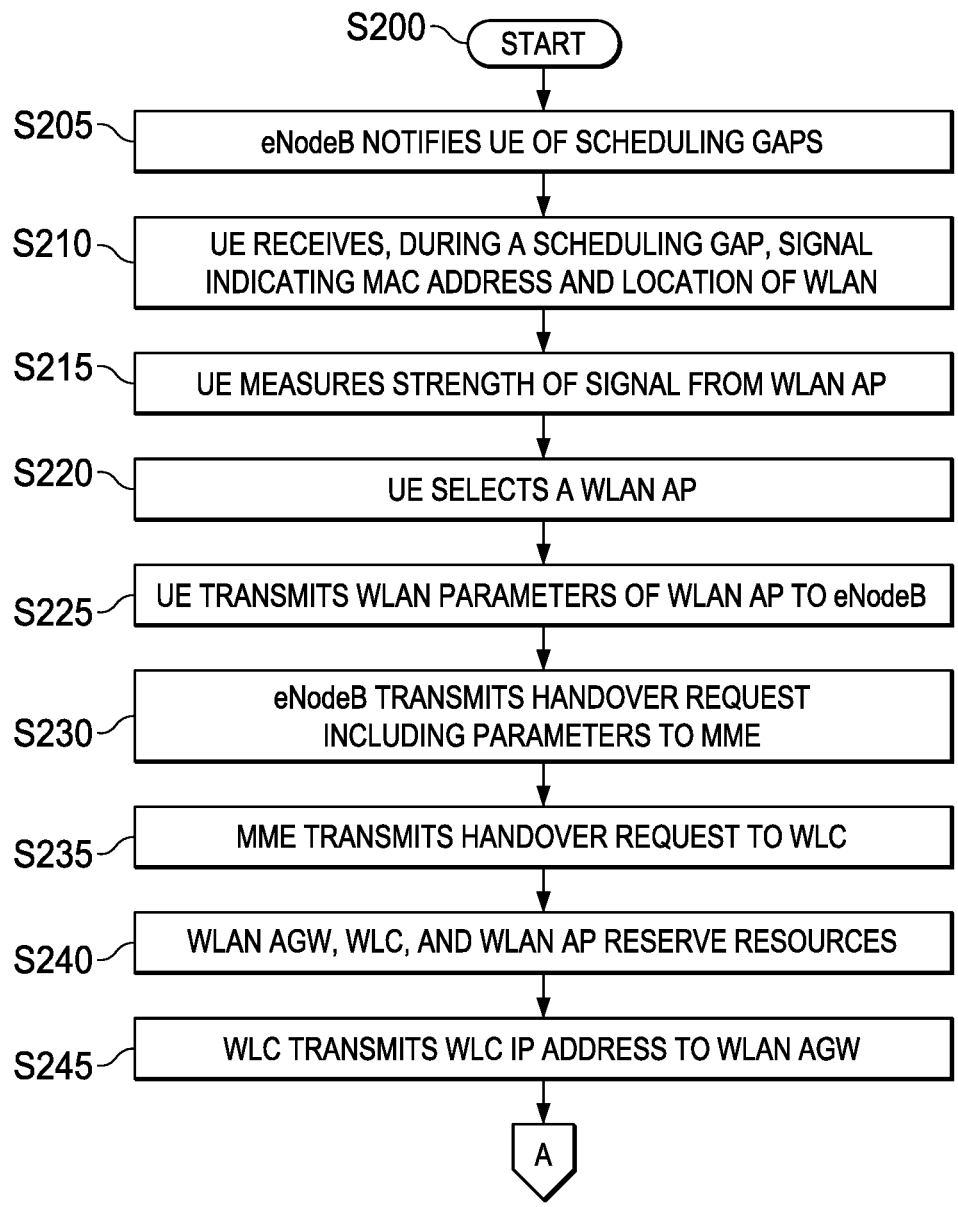
FIGS. 2A-2B illustrate a view of potential operations in a high level approach for an LTE-> WLAN handover.
Figure 2B:
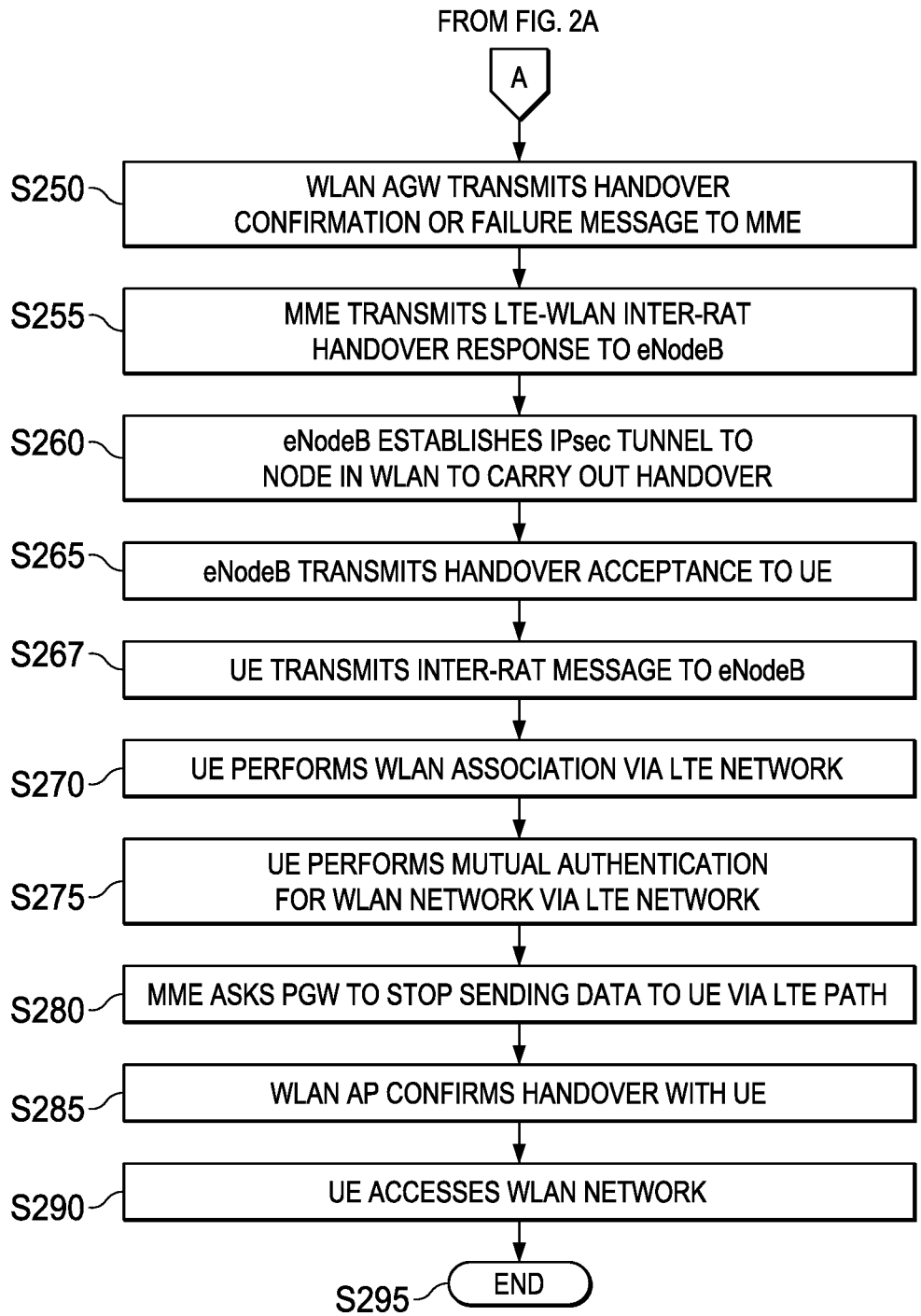
Figure 3A:
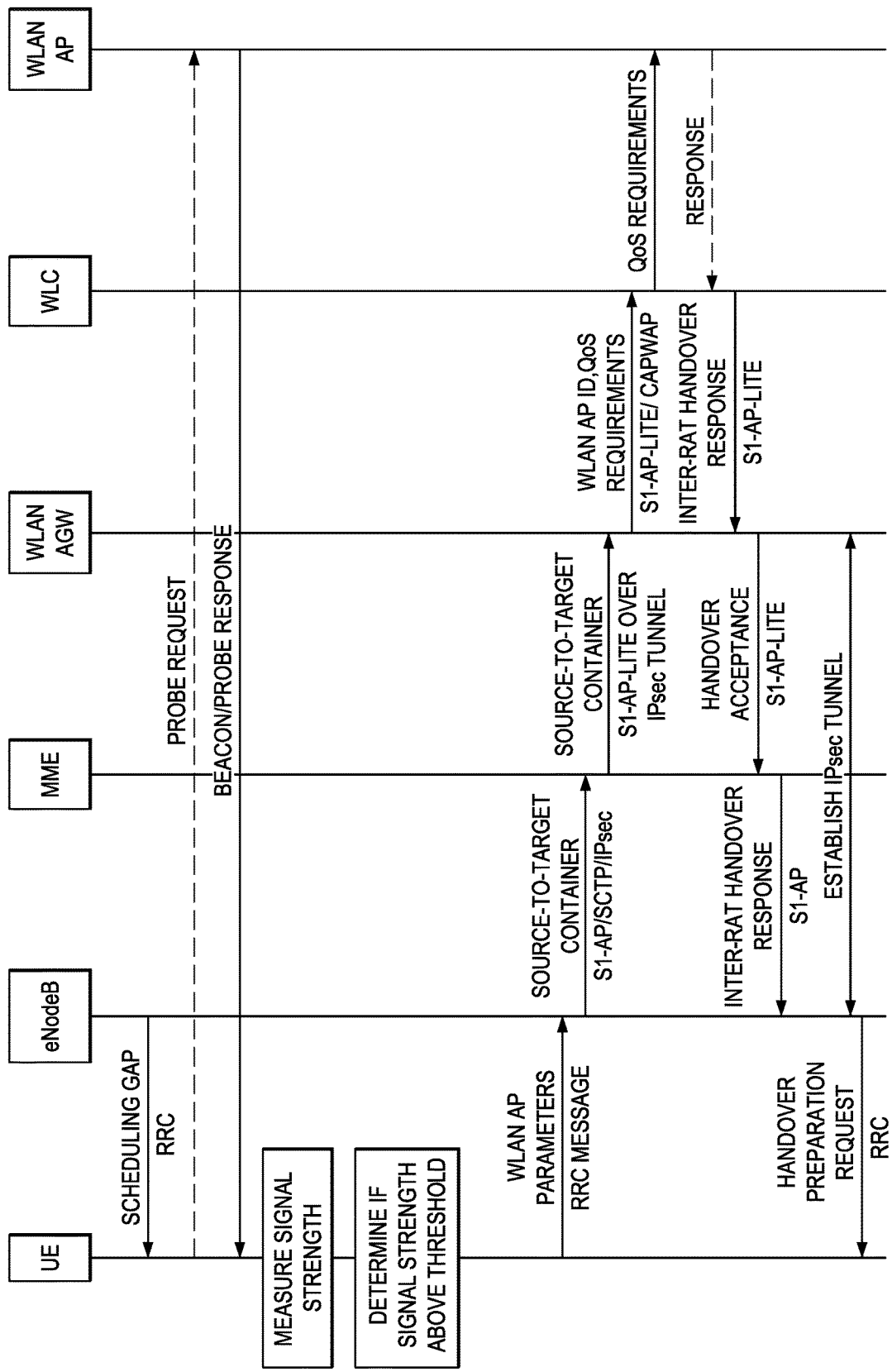
FIGS. 3A-3B illustrate another view of potential operations in a high level approach for an LTE-> WLAN handover.
Figure 3B:
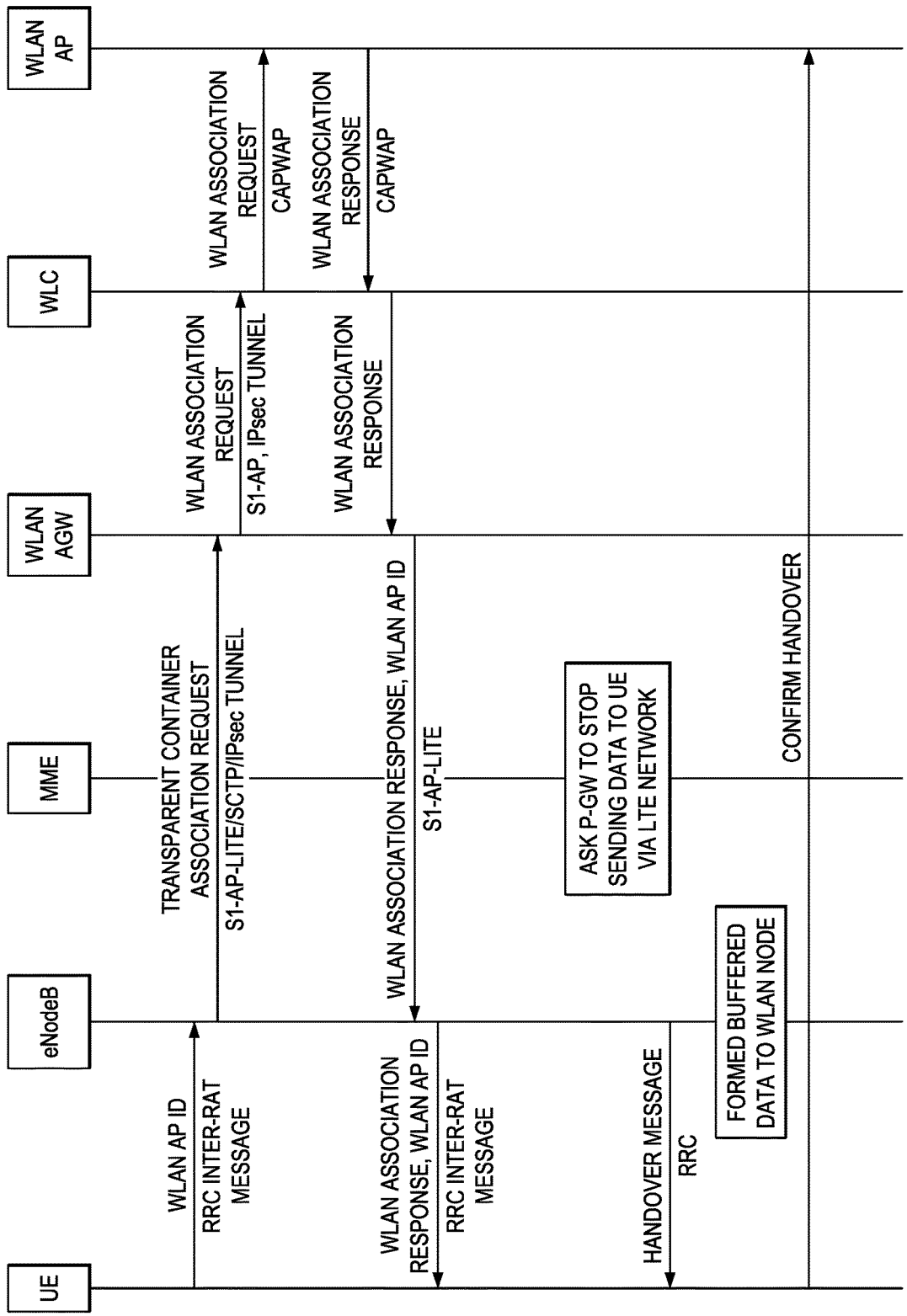

FIGS. 2A-2B and 3 illustrate potential operations in a high-level approach for an LTE→WLAN handover. At the initial point of the flow, the UE is attached to the LTE network having used LTE procedures, and data is being communicated between the UE and the Internet via the P-GW. During these operations, data communication continues between the UE and the LTE network via LTE access technology, unless otherwise noted. The operations begin at S200 and proceed to S205 to prepare for handover.

At S205, a MAC scheduler at the eNodeB notifies the UE of scheduling gaps using a Radio Resource Control (RRC) Connection Reconfiguration message. RRC is specified in 3GPP TS 36.331 and is a control plane protocol.

The scheduling gaps refer to periods during which the LTE data transmissions are suspended. In one embodiment, the RRC message asks the UE to measure the signal strength of APs, including WLAN APs, using an Abstract Syntax Notation One (ASN.1) segment. Conventional RRC protocol does not allow an LTE eNodeB to explicitly ask user equipment to measure the signaling strength of WLAN APs. In addition, the enhanced RRC message can indicate a duration of a gap (e.g., in milliseconds).

At S210, the UE receives a signal transmitted from a WLAN AP during at least one of the scheduling gaps provided by the eNodeB in S205. This signal includes a MAC address of the WLAN AP in, for example, a basic service set identification (BSSID) or source address (SA) field. This signal also includes a location of the WLAN AP and an SSID of the WLAN AP.

In one implementation of S210, the signal is any suitable beacon signal from the WLAN AP. This beacon signal can be enhanced, for example, relative to an existing IEEE 802.11 beacon signal, as described later. In another implementation, the signal is any suitable probe response. This probe response can be enhanced relative to an existing IEEE 802.11 signal, as described later. The probe response can be received after the UE sends a probe request message to the WLAN AP prior to S210, for example, in response to a determination that one of the scheduling gaps has begun. Typically, the probe response is received by the UE during the same scheduling gap. However, it is possible, though less desirable, for the probe response to be received by the UE after the conclusion of the scheduling gap or during a later scheduling gap. In such a case, the UE can send a subsequent probe request before the beginning of a scheduling gap to attempt to receive the probe response during a scheduling gap.

The UE sending a probe request message to the WLAN AP, rather than receiving a beacon signal therefrom, can be advantageously implemented when a delay between consecutive beacon signals is high. Because the WLAN AP sends the probe response message in response to receiving the probe request message, the UE can receive the signal at S210 without a delay associated with waiting for the WLAN AP to transmit a next beacon. Thus, the UE can more quickly receive a signal from the WLAN AP.

At S215, the UE measures a signal strength of the signal received at S210.

At S220, the UE selects a WLAN. In one embodiment, the UE determines each WLAN AP having a received signal strength above a threshold. In embodiments in which a signal is received from a single WLAN AP at S210, the determination is based on comparing the signal strength against a predetermined threshold. In embodiments in which multiple signals are received from multiple WLAN APs at S210, the signal strengths may alternatively (or additionally) be compared against each other, such that the UE can determine a WLAN AP having a highest signal strength. In addition, the UE can determined the WLAN AP using policies such as using a WLAN AP from a preferred operator of the UE or using a WLAN AP that uses a preferred WLAN AGW of the UE.

The UE informs the LTE eNodeB about parameters of the selected WLAN AP via an enhanced RRC measurement report message at S225. The WLAN parameters can include the signal strength of the WLAN AP measured by the UE, the MAC address of the WLAN AP, the SSID of the WLAN AP, the location of the UE (measured via GPS or 3GPP techniques), and the location of the WLAN AP as provided in the signal received at S210. The WLAN parameters can additionally include the IP or MAC address(es) of the WLAN AGW or the WLC if provided or other parameters for the WLAN AP extracted from the signal received at S210.

At S230, the eNodeB conveys a handover request to the MME. The handover request can be or include a source-to-target container. This source-to-target container can include quality of service (QoS) requirements of LTE radio bearers to be handed over from the LTE network to the WLAN network (for example, but not necessarily limited to, the eNodeB), the location of the WLAN AP, the MAC address of the WLAN AP, the SSID of the WLAN AP, and the location of the UE. The source-to-target container can additionally include vendor specific parameters if included in the probe response or beacon received at S210.

Further, the source-to-target container can include the IP address of the target WLAN AGW, particularly if the same is included in the probe response or beacon received at S210. In addition, the source-to-target container can include an authentication object for the WLAN network. The authentication object can be included, for example, when the LTE network and the WLAN network belong to the same operator or have a trust relationship.

The source-to-target container can be conveyed from the LTE eNodeB to the MME via an enhanced S1-AP protocol, a Stream Control Transmission Protocol (SCTP), or IPsec. S1-AP is specified in 3GPP TS 36.413 and is a control plane protocol. S1-AP is generally used for message passing between the eNodeB and the MME.

At S235, the MME transmits the handover request (e.g., the source-to-target container) to a node in the WLAN network via a logical LTE_WLAN Handover (LWH) Interface. The handover request can include information about existing flows and/or applications at the UE. The node can be a target WLAN AGW (e.g., a controller, such as an ASR1000 or ASR9000 type of node), if an IP address of the target WLAN AGW was communicated by the UE. If the MME does not receive an IP address of a (target) WLAN AGW, the MME transmits the handover request to an IP address of a default WLAN AGW configured at the MME. The default WLAN AGW then determines the target WLAN AGW based on the location of the WLAN AP, the MAC address of the WLAN AP, and, in some embodiments, the location of the UE. The default WLAN AGW then forwards the handover request to the target WLAN AGW.

In an embodiment in which the WLC serves a large number of APs or if the UE communicates an IP address of the WLC, the node is the WLC. Further, the node can also be the WLAN AP. This disclosure will be written assuming the node is a WLAN AGW.

The LWH interface can use a simple message transfer protocol. As S1-AP is already standardized in 3GPP, a very light version of S1-AP, S1-AP-Lite, can be used as the simple message transfer protocol over an IPsec tunnel. This handover request reduces interruption time, as the handover is make-before-break.

S1-AP-Lite is used in communications between the MME and the WLAN AGW and between the WLAN AGW and the WLC. The S1-AP format is used, but the objects are only those that are described in this disclosure, such as the source-to-target container: other eNodeB-MME objects given in 3GPP T536.413 are generally not part of S1-AP-Lite.

The WLAN AGW (e.g., an Intelligent Services Gateway (ISG) or a Broadband Network Gateway (BNG) executing thereon) keeps mapping information in a database to identify the WLAN AP or the WLC, given the location or the MAC address of the WLAN AP. This mapping information includes locations and MAC addresses of APs that are reachable from the WLAN AGW.

The WLAN AGW then determines the WLC communicating with the WLAN AP and sends a handover request to the WLC via a simple message transfer protocol. In one embodiment, the simple message transfer protocol used between the WLAN AGW and the WLC is S1-AP-Lite. In another embodiment, the simple message transfer protocol used between the WLAN AGW and the WLC is an enhanced version of CAPWAP.

The handover request sent by the WLAN AGW includes an identification of the WLAN AP, an authentication object if provided in the source-to-target container, and the QoS requirements of the LTE bearers to be handed over to the WLAN network. The WLAN AGW checks to see if the policies of the WLAN AP allow for service of the UE. The WLC then transmits a handover request to the WLAN AP at S240. This handover request includes the QoS requirements of the LTE bearers (DRBs).

The LTE data bearers carry data for the UE; thus, the UE has multiple DRBs across the LTE network (e.g. a UE having three applications can have three DRBs going through UE eNodeB-SGW-PGW). These DRBs can correspond to one or multiple access point names (APNs) (e.g., a UE having one DRB with PGW1 going through UE-eNodeB-SGW-PGW1 and another DRB with PGW2 going through UE-eNodeB-SGW-PGW2). Information about (ideally, all) the DRBs is communicated from the LTE network to the WLAN network during handover preparation, such as beginning with the source-to-target container transmitted by the eNodeB. This information includes QoS requirements of each DRB, an APN ID, an IP address of the P-GW, etc. In some embodiments, the MME supplements or otherwise modifies the information received from the eNodeB to reflect a DRB.

In many embodiments, all DRBs to which resources are allocated in the LTE network are handed over to the WLAN network during the handover process. For example, the P-GW switches its data path from P-GW-S-GW-LTE eNodeB-UE to P-GW-WLAN AGW-WLC-WLAN AP-UE.

Thus, during handover preparation, the WLAN AGW checks whether or not the WLAN AGW and the WLAN network can allocate resources to handover the LTE DRBs to the WLAN network at S240. The WLAN AGW, the WLC, and the WLAN AP reserve resources (e.g., if policies for the UE allow such reservation) for flows that are to be handed over from the LTE network to the WLAN network. The WLAN AP can transmit to the WLC a confirmation if the handover is approved. Of course, embodiments are possible in which the WLAN AP sends a response only if the handover is not approved.

At S245, the WLC (or, in some embodiments in which the WLAN AP does not send a response to the WLC at S240, the WLAN AP) transmits an LTE-WLAN Inter-RAT Handover Response to the WLAN AGW via S1-AP-Lite or any simple message transfer protocol. The Handover Response includes an IP address (e.g., the IP address of the WLC) to which the LTE eNodeB can create an IPsec tunnel, and an indication as to whether the WLC or WLAN AP can accept each of the LTE DRBs for handover. Although the WLC IP address and the LTE DRB acceptance indication are described separately, in some embodiments, the WLC IP address itself indicates whether the LTE DRBs can be accepted. For example, the WLC IP address can indicate the LTE DRBs are not accepted, if the WLC IP address is a predefined address (such as a loopback address) or if the WLC IP address falls outside of an expected range or inside of a range known to be invalid.

At S250, the WLAN AGW transmits a handover acceptance or failure message to the MME via the S1-AP-Lite protocol. At S255, the MME transmits an LTE-WLAN Inter-RAT Handover Response to the eNodeB via S1-AP. At S260, the LTE eNodeB establishes an IPsec tunnel to a WLAN node for handover purposes. This tunnel can be established to the WLAN AP, to the WLC, or to the WLAN AGW, based on an IP address transmitted from the WLAN AGW to the MME. For deployment purposes, it is easy to establish the IPsec tunnel from the LTE eNodeB to the WLAN AGW. The IPsec tunnel can be established to the WLC in a case where the WLC supports a large number of APs. Establishing the IPsec tunnel to the WLAN AP is suitable for high capacity, thick APs (as thin or low capacity APs do not support IPsec in general). If the processing power of the WLAN AP is limited, the IPsec tunnel can be established to the WLC or WLAN AGW.

The LTE eNodeB then asks the UE to start handover preparation via an RRC message (e.g., Handover from EUTRA Preparation Request at S265). If the UE has only one active RF chip at a time, then WLAN association messages are routed via the LTE network, and RRC can be enhanced for this purpose. Thus, the UE transmits at S267 an RRC Inter-RAT message WLAN Association Request to the eNodeB. The WLAN Association Request includes a WLAN AP ID (e.g., MAC address).

In embodiments in which an IPsec tunnel is established between the LTE eNodeB and the WLAN AGW, the eNodeB transmits an Inter-RAT Transparent Container WLAN Association Request to the WLAN AGW. This WLAN Association Request transmitted by the eNodeB can include the WLAN AP ID. The WLAN AGW can then transmit to the WLC a WLAN Association Request via S1-AP-Lite over an IPsec tunnel. The WLC can transmit to the WLAN AP a WLAN Association Request via enhanced CAPWAP. The WLAN AP responds to the WLC with a WLAN Association Response via CAPWAP. The WLC transmits to the WLAN AGW a WLAN Association Response. The WLAN AGW can transmit to the LTE eNodeB an Inter-RAT transparent container via S1-AP-Lite. The Inter-RAT transparent container includes a WLAN Association Response and a WLAN AP ID. The LTE eNodeB transmits to the UE an Inter-RAT message via RRC. This Inter-RAT message includes the WLAN Association Response and the WLAN AP ID.

In embodiments in which an IPsec tunnel is established between the LTE eNodeB and the WLC, the eNodeB transmits an Inter-RAT message to the WLC via S1-AP-Lite and the IPsec tunnel. The Inter-RAT message includes a WLAN Association Request and a WLAN AP ID. The WLC can transmit to the WLAN AP a WLAN Association Request via enhanced CAPWAP. The WLAN AP responds to the WLC with a WLAN Association Response via CAPWAP. The WLC transmits to the LTE eNodeB an Inter-RAT message. This Inter-RAT message includes a WLAN Association Response and a WLAN AP ID. The LTE eNodeB transmits to the UE an Inter-RAT message via RRC. This Inter-RAT message includes the WLAN Association Response and the WLAN AP ID.

Thus, the UE can perform mutual association for the WLAN network via the LTE network at S270, using enhanced RRC/S1-AP messages. In the WiFi network, the UE should associate with the WLAN AP. Current systems let the UE handover from an LTE network to a WiFi network and perform association in the WiFi network after the handover. Further, current systems support WiFi association exchange between the UE, the WLAN AP, and the WLC.

In some implementations of the present disclosure, the UE performs WiFi association before actually handing over from the LTE network to the WiFi network. The UE keeps communicating data via the LTE network, and the UE can exchange WiFi association messages via the LTE network. In some embodiments, the WiFi association messages are carried from the UE, to the LTE eNodeB, to the WLAN AGW, to the WLC, and finally to the WLAN AP. Therefore, the UE can perform WiFi association before actually handing over to WiFi and, during this period, communication via LTE network continues. In that sense, some embodiments can reduce handover transition time.

After WiFi association, the UE performs authentication in the WiFi network at S275 via the LTE network. This authentication can be used in a scenario in which it is not possible to authenticate using AuthObject (as in IEEE 802.11r) and a new round of authentication is used in the WLAN network. A node in the WLAN network (e.g., the WLAN AGW, the WLC, or the WLAN AP) performs Extensible Authentication Protocol for GSM Subscriber Identity Module (EAP-SIM) for the WLAN network with the AAA. The authentication can be performed with the LTE eNodeB using S1-AP-Lite messages and with the UE using enhanced RRC messages. Thus, like the association, WiFi authentication messages are routed via the LTE network. By so routing the messages, the UE can be authenticated for WiFi before actually handing over to the WLAN network.

At S280, the MME asks the P-GW to stop sending downlink data to the SGW for the UE, and the eNodeB sends the UE an RRC message to handover to the WLAN. The MME asks the P-GW to send data for the UE to the WLAN AGW, and the eNodeB forwards buffered data to a node (e.g., the WLAN AGW, the WLC, or the WLAN AP) in the WLAN network. The UE confirms handover with the WLAN AP at S285. The UE is synchronized to the WLAN network, and data communication by the UE via the WLAN network is started at S290. This is because authentication and resource reservation have already been performed. Thus, a Make-Before-Break handover results. The process ends at S295.

FIG. 4 shows an example of the beacon that can be received by the UE from the WLAN AP at S210. FIG. 5 shows an example of the probe response that can be received by the UE from the WLAN AP at S210. The beacon and probe response messages can include vendor specific fields that are enhancements to these messages over existing IEEE 802.11 specifications: the location of the WLAN AP and the IP address of the WLAN AGW are not sent in a beacon message under the current IEEE 802.11 standard. The vendors can be, for example, cellular telephone service providers or equipment manufacturers.

One of the vendor specific fields includes a location of the WLAN AP. This location can be configured at the WLAN AP or obtained via a GPS chip at the WLAN AP. Several LTE/3G-WLAN multimode APs are expected to have a GPS chip in them. Another vendor specific field includes a MAC address of the WLAN AP, if the MAC address differs from an address used by the BSSID in the 802.11 frame (e.g., in the header).

In some embodiments, the beacon and probe response messages include additional vendor specific fields. For example, one additional vendor specific field can include or otherwise indicate an IP address of a WLAN AGW with which the WLAN AP communicates, if available at the AP.

An additional vendor specific field can include or otherwise indicate an IP or MAC address of a WLC with which the WLAN AP communicates, if available at the AP. Note that an AP can communicate with multiple WLC(s). Each AP can be configured with an IP address of its WLAN AGW or a default WLC for this purpose.

WLAN→LTE Handover

Figure 6:
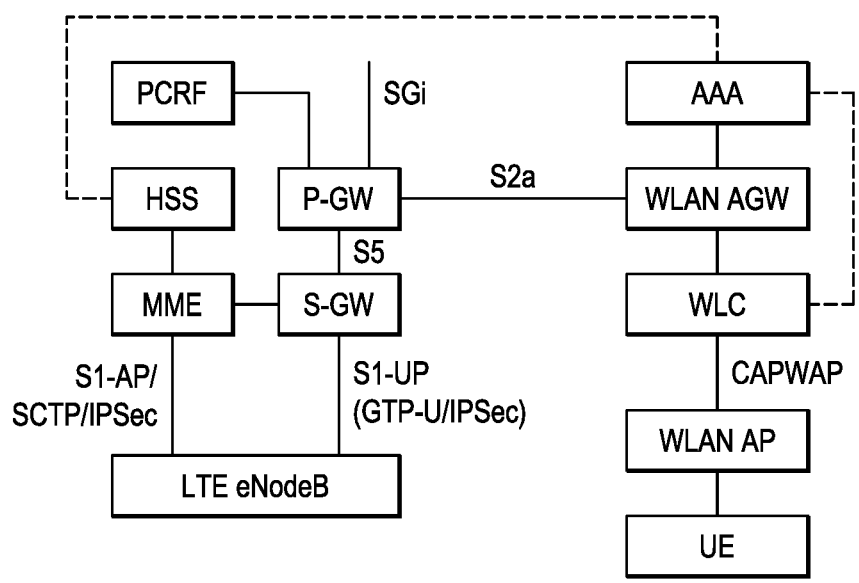
FIG. 6 illustrates a system architecture in which a WLAN-→LTE handover can be implemented.
Figure 7:
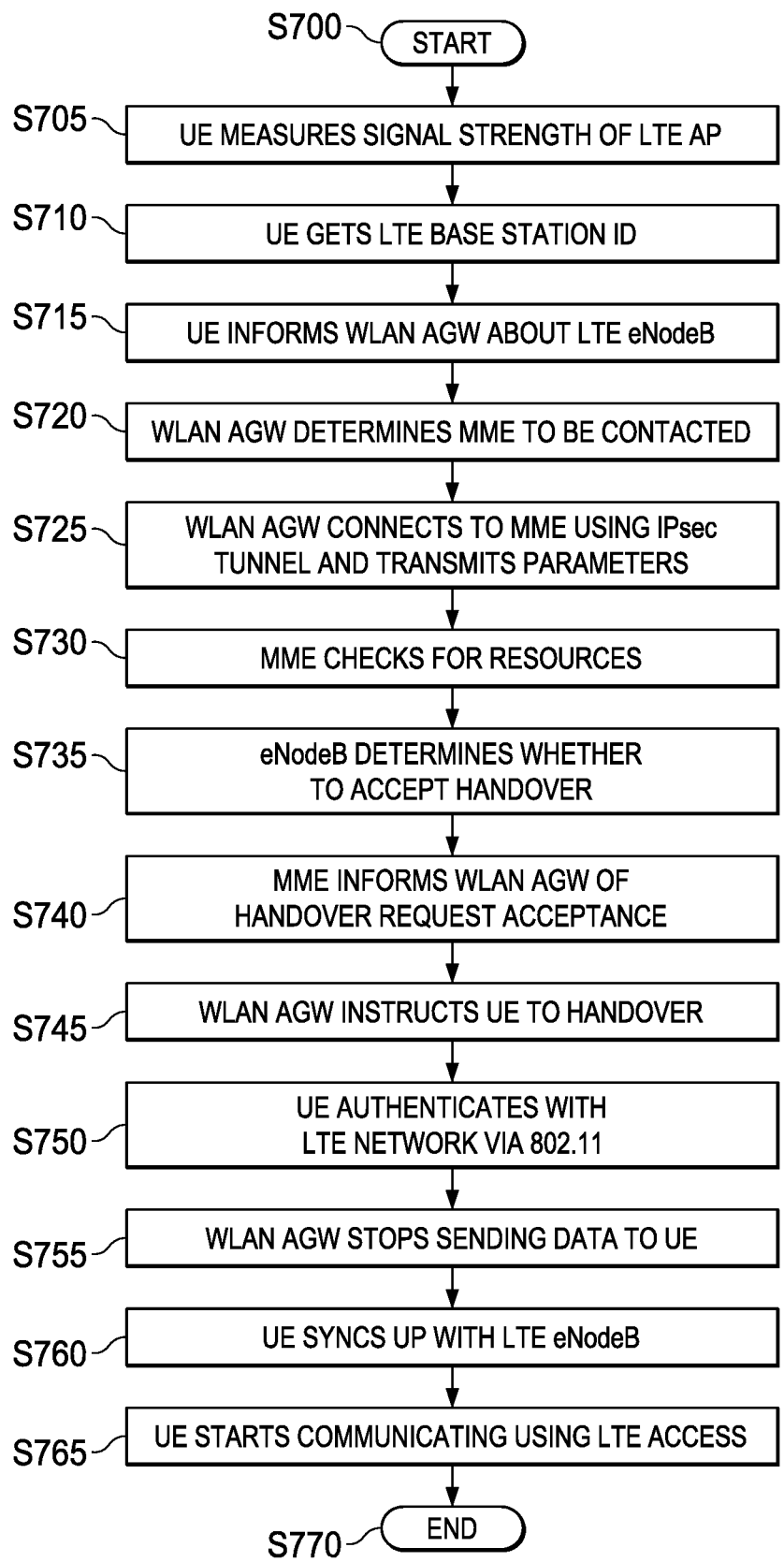
FIG. 7 illustrates a view of potential operations in a high level approach for a WLAN→LTE handover.
Figure 8:
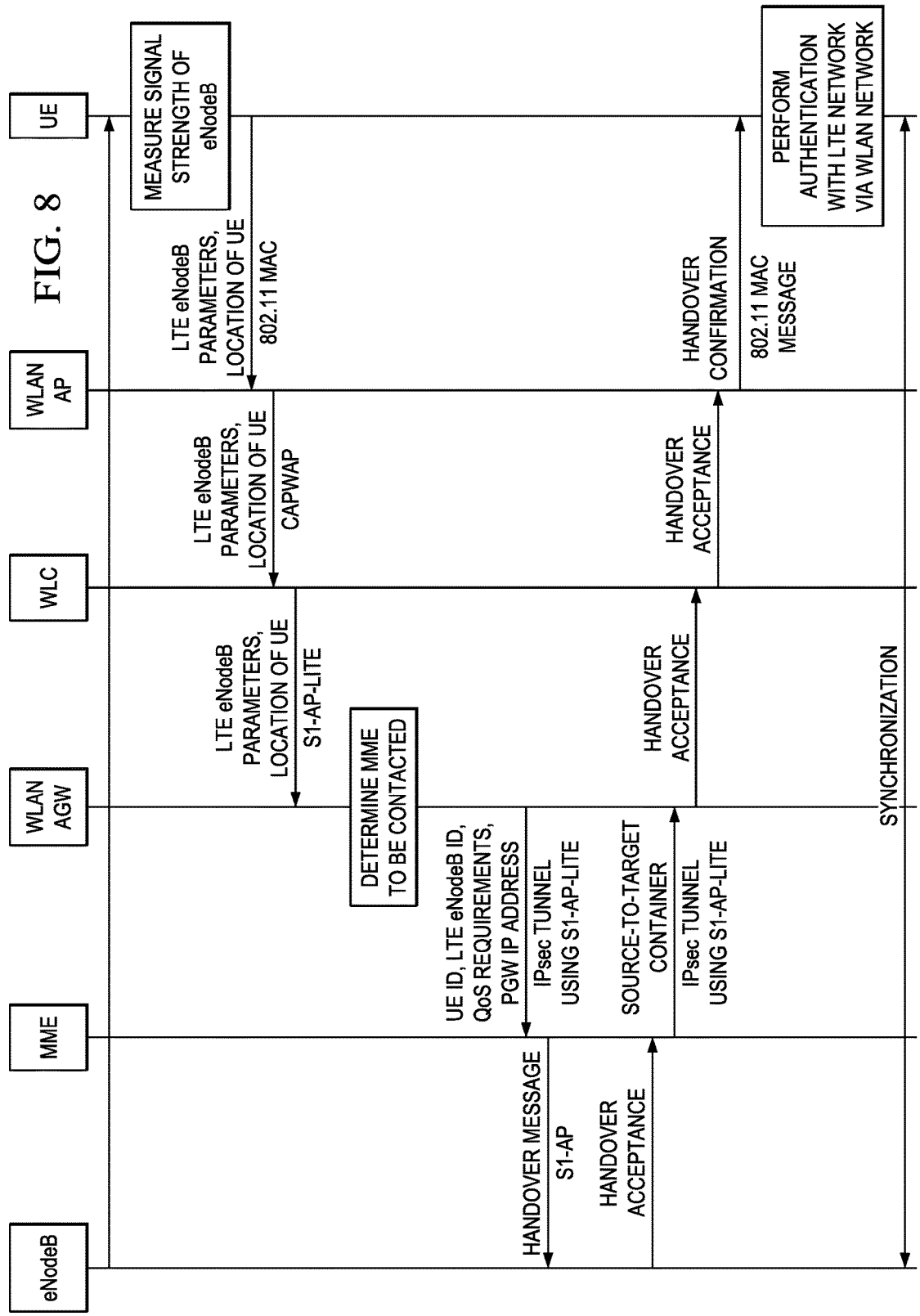
FIG. 8 illustrates another view of potential operations in a high level approach for a WLAN→LTE handover.

FIG. 6 illustrates a system architecture in which a WLAN→LTE handover can be implemented. FIGS. 7-8 illustrate potential operations in a high-level approach for a WLAN→LTE handover. During these operations, data communicates between the UE and the Internet via the P-GW. Specifically, prior to the handover, the data flow begins at the P-GW, and proceeds to the WLAN AGW, to the WLC, to the WLAN AP, and to the UE. The UE continues data transmission via the WLAN network, until otherwise noted. Generally, LTE messages are sent via the WLAN network to prepare for handover.

The operations begin at S700 and proceed to S705 at which, during a short idle period, the UE measures the signal strength of an LTE AP (e.g., an eNodeB) and performs an initial synchronization to decode the LTE eNodeB identity at S710.

At S715, the UE informs the WLAN AGW about the LTE eNodeB. Specifically, the UE conveys, to the WLAN AGW, LTE eNodeB parameters (e.g., the signal strength of the LTE eNodeB, an LTE eNodeB identification (ID), an LTE UE ID), a location of the UE, etc.

In some implementations, the UE informs the WLAN AGW by first transmitting an enhanced 802.11 MAC message to the WLAN AP. Such an implementation is typically used when it is not desired to create an IPsec tunnel from the UE. In this case, encryption is performed between the UE and the WLAN AP via IEEE 802.11 methods. As discussed later, the type of the frame control field of the 802.11 MAC message can be set to 01, and the subtype can be set to 0000. After the WLAN AP receives this 802.11 MAC message, the WLAN AP transmits a message to the WLC via enhanced CAPWAP, and the WLC transmits a message to the WLAN AGW via S1-AP-Lite. In this case, TLS or IPsec can be used for security.

In another embodiment, this informing is done via an IPsec tunnel. In this case as well, TLS or IPsec can be used for security.

At S720, the WLAN AGW determines an MME to be contacted, and, at S725, the WLAN AGW transmits parameters to an MME. The MME determined in S720 need not be the same as the MME to which the parameters are transmitted in S725, as explained below. In one embodiment, the WLAN AGW determines a target MME based on the LTE eNodeB parameters (e.g., the eNodeB ID) and the location of the UE provided by the UE.

In another case, the parameters and the location of the UE do not identify the MME, and the WLAN AGW instead contacts a default MME. The WLAN AGW determines the identity of this default MME based on mapping information kept in a database accessible by the WLAN AGW. The WLAN AGW contacts the default MME via an IPsec tunnel and provides parameters (e.g., the eNodeB ID). The default MME determines the target MME for the eNodeB based on the eNodeB ID or, in some embodiments, the location of the UE, the ID of the LTE eNodeB, and/or the location of the LTE eNodeB. The default MME then informs the WLAN AGW of the identity of the target MME. The WLAN AGW then establishes a tunnel with the target MME to carry out the actual handover of the UE from the WLAN AGW to the target LTE eNodeB controlled by that target MME.

In another scenario, the WLAN AGW determines the default MME and communicates with the default MME via a tunnel. The default MME then determines the target MME and forwards a handover message to the target MME.

Typically, MMEs are deployed in pools. For example, one operator might have a set of MMEs in a pool, another operator might have another set of MMEs in another pool, and so on. If the default MME and the target MME are part of the same pool, the WLAN AGW can simply keep communicating with the default MME, which will take care of communication with the target MME. If the default MME and the target MME are part of different pools, the default MME transmits the identity of the target MME to the WLAN AGW. In a way, the WLAN AGW contacts a server to know the identity of the target MME, where the server could be a database server or a default MME.

The WLAN AGW conveys, at S725, parameters to the target MME over an LWH interface via an IPsec tunnel using an S1-AP-Lite protocol. In one embodiment, the conveyed parameters include the UE ID, the LTE eNodeB ID, QoS requirements of WLAN sessions, and PGW IP addresses/APN IDs. Of course, as detailed previously, the WLAN AGW need not establish the IPsec tunnel specifically to the target MME: in at least one embodiment, the WLAN AGW establishes an IPsec tunnel to the default MME, and the default MME conveys these parameters to the target MME.

At S730, the MME checks for resources in the LTE network for WLAN sessions. The MME does a conventional procedure for handover preparation while treating the WLAN as another 3GPP-like access technology. For example, the MME sends a handover message to the LTE eNodeB via S1-AP. The MME also establishes tunnels between the PGW and the SGW and between the SGW and the eNodeB. In the case that an IPsec tunnel from the UE is not desired (e.g., in the case that the UE transmitted an 802.11 MAC message to the WLAN AP for handover preparation), if WLAN sessions to be handed over correspond to multiple APNs, multiple such tunnels are created. The eNodeB determines whether to accept the handover and responds to the MME via S1-AP, SCTP, or IPsec at S735.

At S740, the MME informs the WLAN AGW about whether the eNodeB accepted the handover. Specifically, if the handover is not accepted, the WLAN AGW then informs the UE and the process ends. If the handover is accepted, the MME provides to the WLAN AGW a source-to-target container providing LTE parameters to aid in LTE access and synchronization (such as a reserved RACH preamble— as in 3GPP for initial sync). The MME can so inform the WLAN AGW over an LWH interface via an IPsec tunnel using S1-AP-Lite.

At S745, the WLAN AGW informs the UE about whether the eNodeB accepted the handover. In the case that an IPsec tunnel from the UE is not desired (e.g., in the case that the UE previously transmitted an 802.11 MAC message to the WLAN AP for handover preparation), the WLAN AGW confirms the handover with the UE via an IEEE 802.11 MAC message. In some embodiments, the WLAN AGW informs the WLC about the acceptance of the handover, the WLC then informs the WLAN AP about the acceptance, and the WLAN AP transmits the 802.11 MAC message to the UE. As discussed later, the type of the frame control field of the 802.11 MAC message can be set to 01, and the subtype can be set to 0010.

In the case the UE informed the WLAN AGW of parameters via an IPsec tunnel in S715, the WLAN AGW informs the UE, via an IPsec tunnel using an S1-AP-Lite protocol, that the eNodeB accepted the handover. The UE then performs authentication at S750 with the LTE network via the WLAN network using enhanced 802.11 MAC messages.

Subsequently, the WLAN AGW then stops sending data to the UE at S755, and the data communication via WLAN access stops. In some implementations, the WLAN AGW forwards buffered data to the P-GW. The P-GW starts sending data to the SGW instead of the WLAN AGW.

The UE syncs up with the LTE eNodeB at S760 and uses the parameters provided in the source-to-target container for a fast sync-up. The UE then starts communicating using the LTE access at S765. The process ends at S770. Following the handover, the data flow is from the P-GW, to the S-GW, to the LTE eNodeB, to the UE.

Figures 9, 10:
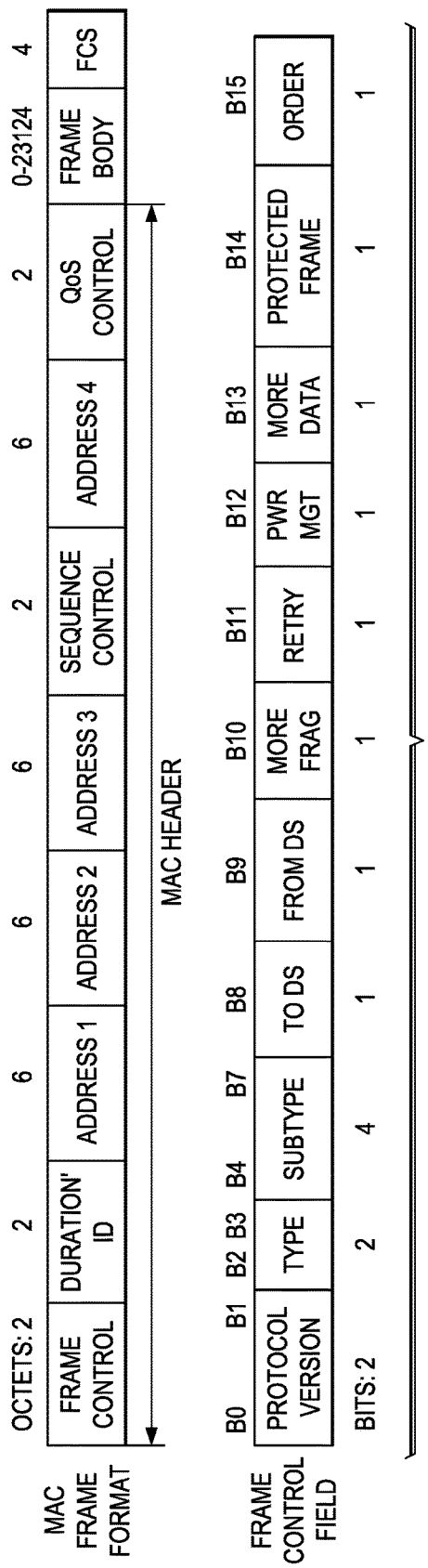
FIG. 9 illustrates an example of the 802.11 MAC message that can be transmitted from the UE to the WLAN AP at S715.
FIG. 10 illustrates an example of the type and subtype field of the frame control field of the IEEE 802.11 MAC frame shown in FIG. 9.

FIG. 9 illustrates an example of the 802.11 MAC message transmitted by the UE to the WLAN AP in some implementations of S715. In particular, FIG. 9 shows a MAC frame format, including a frame control field (2 bytes), a duration ID field (2 bytes), a field for address 1 (e.g., DA) (6 bytes), a field for address 2 (e.g., SA) (6 bytes), a field for address 3 (e.g., BSSID) (6 bytes), a sequence control field for identifying message order and eliminating duplicate frames (2 bytes), a field for address 4 (optional) (6 bytes), a QoS control field (2 bytes), a frame body (0-2312 bytes), and a frame check sequence field (4 bytes).

FIG. 9 also shows the MAC frame control field includes a protocol version field (2 bits), a type field (2 bits), a subtype field (4 bits), a To DS (distribution system) field (1 bit), a From DS field (1 bit), a more fragments field (1 bit), a retry field (1 bit), a power management field (1 bit), a more data field (1 bit), a protected frame field (1 bit), and an order field (1 bit).

FIG. 10 illustrates a use of the type and the subtype field of the frame control field of the IEEE 802.11 MAC frame. Specifically, control type 01 and subtype 0000-0111 are currently reserved and are not being used by WLAN control messages. Thus, some embodiments of the present disclosure use a portion of that block for WLAN→LTE handover preparation.

As shown in FIG. 10, subtype 0000 is used for a WLAN→LTE handover request message sent in, for example, S715. This request message is sent from the UE to the WLAN AP to convey the signal strength of the LTE eNodeB, a location of the UE, the LTE eNodeB ID, and the LTE UE ID. Subtype 0001 is used for an acknowledgement (ACK). Subtype 0010 is used for a WLAN→LTE handover confirm message sent from the WLAN AP to the UE such as in, for example, S745.

In terms of the UE discussed herein, the UEs can be any apparatus associated with clients or customers wishing to initiate a communication in system architecture 100 via some network. The term 'apparatus' is interchangeable with the terminology 'endpoint' and 'user equipment (UE)', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within system architecture 100.

The apparatus may also be inclusive of a suitable interface to the human user, such as a microphone, a display, a keyboard, or other terminal equipment. The apparatus may also be any device that seeks to initiate a communication on behalf of another entity or element, such as a program, a database, or any other component, device, element, or object capable of initiating an exchange within system architecture 100. Data, as used herein in this document, refers to any type of numeric, voice, video, or script data, or any type of source or object code, or any other suitable information in any appropriate format that may be communicated from one point to another. The apparatus can be able to communicate wirelessly using a macro service. As the apparatus is moved from one location to another, a hand off can be made between network elements (or to macro cell towers), enabling the user to experience continuous communication capabilities.

Each P-GW, S-GW, LTE eNodeB, WLAN AGW, MME, WLC, and/or WLAN AP can perform actions in order to offer suitable connectivity to one or more wireless devices using any appropriate protocol or technique. For example, in general terms, each WLAN AP represents an access point device that can allow wireless devices to connect to a wired network using Wi-Fi, Bluetooth, WiMAX, UMTS, or any other appropriate standard. Hence, the broad term 'access point' is inclusive of any wireless access point (WAP), a femtocell, a hotspot, a picocell, a Wi-Fi array, a wireless bridge (e.g., between networks sharing same Service Set Identifier (SSID) and radio channel), a wireless local area network (LAN), or any other suitable access device, which may be capable of providing suitable connectivity to a wireless device. In certain cases, the access point connects to a router (via a wired network), and it can relay data between the wireless devices and wired devices of the network.

In one example implementation, the P-GW, S-GW, LTE eNodeB, WLAN AGW, MME, WLC, and/or WLAN AP are network elements that facilitate or otherwise help coordinate the seamless mobility activities discussed herein (e.g., for networks such as those illustrated in FIG. 1). As used herein in this Specification, the term 'network element' is interchangeable with 'apparatus' and, further, is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, P-GW, S-GW, LTE eNodeB, WLAN AGW, UE, MME, WLC, and/or WLAN AP include software to achieve the seamless mobility operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

In regards to the internal structure associated with system architecture 100, each of P-GW, S-GW, LTE eNodeB, WLAN AGW, UE, MME, WLC, and/or WLAN AP can include memory elements for storing information to be used in achieving the seamless mobility operations, as outlined herein. Additionally, each of these devices may include a processor that can execute software or an algorithm to perform the seamless mobility activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to P-GW, S-GW, LTE eNodeB, WLAN AGW, UE, MME, WLC, and/or WLAN AP could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the seamless mobility functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors could transform an element or an article (e.g., data) from one state or thing to another state or thing. In another example, the seamless mobility activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that system architecture 100 (and its teachings) are readily scalable and further can accommodate a large number of components, as well as more complicated/sophisticated arrangements and configurations. Accordingly, the examples provided should not limit the scope or inhibit the broad teachings of system architecture 100 as potentially applied to a myriad of other architectures.

It is also important to note that the previously described activities illustrate only some of the possible signaling scenarios and patterns that may be executed by, or within, system architecture 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system architecture 100 in that any suitable arrangements, chronologies, configurations, and timing mechanisms may be provided without departing from the teachings of the present disclosure.

LTE-WLAN Handover when the UE can Access the LTE and WLAN Networks Simultaneously The previous mobility methods deal with scenarios where the UE can access exclusively one of the LTE or WiFi at a time. This section extends those methods for the scenario where the UE can access the LTE network as well as the WiFi network simultaneously. The UE in this case does not need to be synchronized to the WLAN network via the LTE network, unlike the one RF chip case.

The method begins when the UE is attached to the LTE network having used LTE procedures, and data is communicated between the UE and the Internet via the LTE network and, specifically, the P-GW. At the same time, the UE continues to monitor WiFi messages. The LTE eNodeB asks the UE to measure the signal strength of neighboring WLAN access points. The UE receives a signal from a WLAN AP and gets a MAC address of the WLAN AP, a location of the WLAN AP, and SSID of the WLAN AP from the signal.

The LTE network then uses the identity information (e.g., the MAC address, the location) of the WLAN AP to reserve resources in the WLAN network for existing applications of the LTE-WiFi UE that are active on the LTE network. In one embodiment, the operations specified in S225-S265 are used for this purpose.

In this scenario, association and authentication, similar to the operations specified in S270-S275, can happen via the WLAN network itself as the UE can access both networks simultaneously. Once resources are reserved, the LTE eNodeB sends a handover command to the UE asking the UE to handover to the WiFi network, similar to the operations specified with regard to S285. The network then switches data transmission from the LTE network to the WLAN network, and the UE hands over to the WLAN network. This handover is similar to the operations specified with regard to S290.

Figure 11:
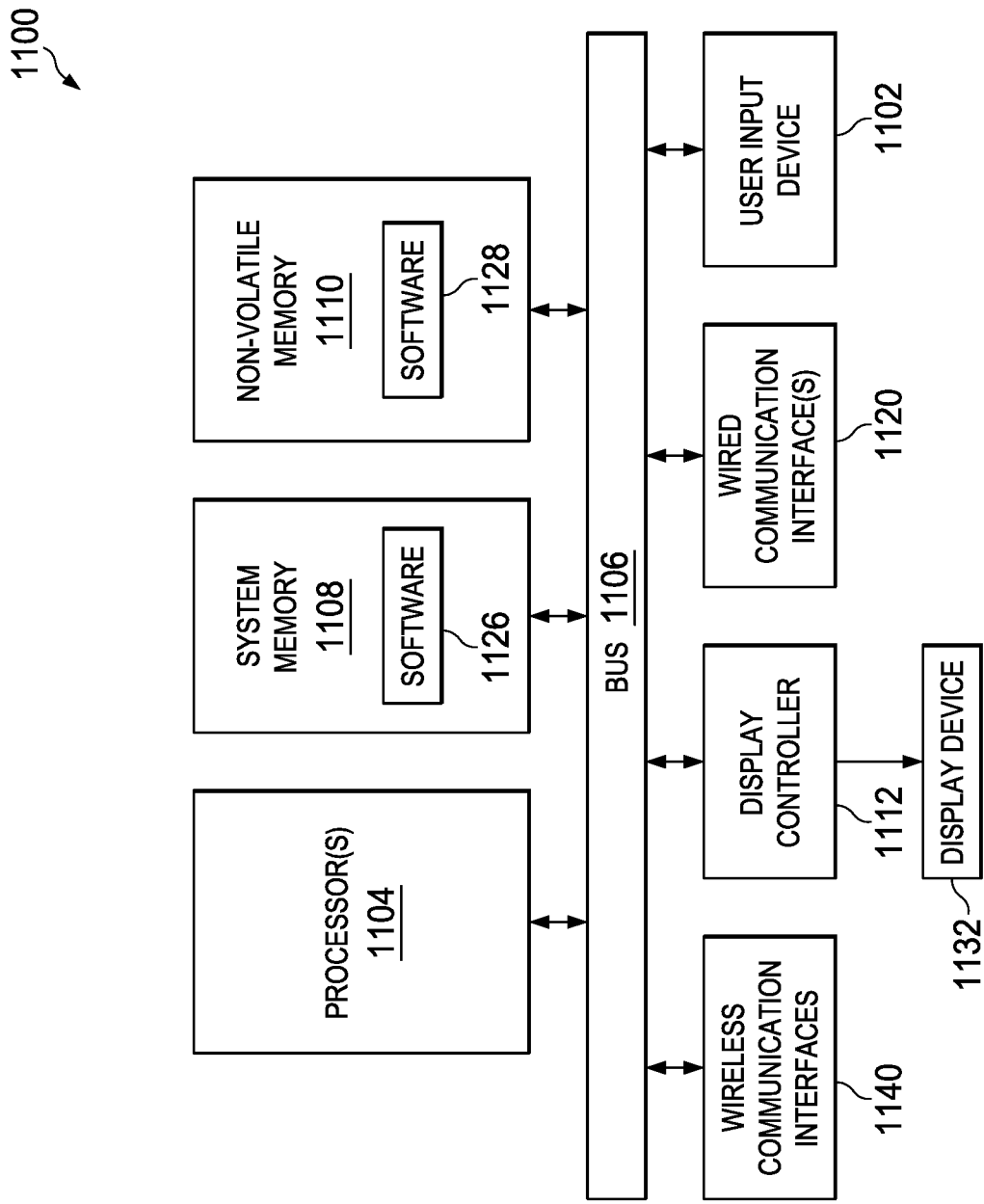
FIG. 11 illustrates an example computer system that can be used to realize the devices of the LTE and WLAN systems.

FIG. 11 illustrates an example computer system that can be used to realize the devices of the LTE and WLAN systems. More particularly, FIG. 11 illustrates an embodiment of a device 1100 that can be included in any portion (or shared by portions) of the P-GW, the PCRF, the WLAN AGW, the S-GW, the MME, the LTE eNodeB, the HSS, the AAA, the UE, and the WLC.

The device 1100 includes one or more processor(s) 1104, a bus 1106, system memory 1108, non-volatile memory 1110, volatile memory 1114, a display controller 1112, a display device 1132 coupled to display controller 1112, wired communication interface(s) 1120, wireless communication interface(s) 1140, and user input device 1102. The various elements of device 1100 are typically coupled to each other through bus 1106, though additional or alternative connections are possible.

Bus 1106, in a particular embodiment, includes a controller to provide an interface to the one or more processor(s) 1104 and/or to any component in device 1100. Bus 1106, in a particular embodiment, includes a memory controller to provide an interface to system memory 1108. System memory 1108 can store data and/or instructions, such as software 1126. System memory 1108 is or includes dynamic random access memory (DRAM) or SDRAM, for example.

Bus 1106, in a particular embodiment, includes one or more input/output (I/O) controllers to provide an interface to display device 1132, non-volatile memory 1110, a user input device 1102 (e.g., a keyboard, a mouse, a joystick, a trackball, a glove, a microphone, a camera, a camcorder, and/or a scanner), a speaker, or a printer.

Non-volatile memory 1110 can store data and/or instructions, for example, within software 1128. Non-volatile memory 1110 can include flash memory, for example, and/or non-volatile storage device(s), such as a magnetic disk, an optical disc, or a magneto-optical disc. A magnetic disk can be, for example, a hard disk drive (HDD) or a floppy disk. A optical disc can be, for example, a compact disc (CD), a digital versatile disc (DVD), or a Blu-Ray disc (BD). A magneto-optical disc can be, for example, a Mini-Disc (MD).

Wired communications interface(s) 1120 can provide an interface for device 1100 to communicate over one or more wired networks with any other device. Wired communications interface(s) 1120 can include any suitable hardware and/or firmware. Wired communications interface(s) 1120, in particular embodiments, includes, for example, a network adapter or a telephone modem. The wired communications interface(s) 1120 are an example of a wired communication means.

Wireless communications interface(s) 1140 can provide an interface for device 1100 to communicate over one or more wireless networks with any other device. These networks can include, but are not limited to, LTE and WiFi. Wireless communications interface(s) 1140 can include any suitable hardware and/or firmware. Wireless communications interface(s) 1140, in a particular embodiment, includes, for example, a wireless network adapter and/or a wireless modem. The wireless communications interface(s) 1140 are an example of a wireless communication means.

For one embodiment, at least one processor 1104 is packaged together with logic for one or more controllers of bus 1106 to form a System in Package (SiP). For a particular embodiment, at least one processor 1104 is integrated on the same die with logic for one or more controllers of bus 1106 to form a System on Chip (SoC).

At least one processor 1104 in one embodiment can execute software to process information received over wired communication interface 1120 or wireless communication interface 1140. Thus, the one or more processor(s) can execute the operations described in this disclosure, particularly those described in the algorithms of FIGS. 2A-2B, FIGS. 3A-3B, and FIGS. 7-8. Such software can include, for example, driver software and/or application software. The one or more processor(s) 1104 are an example of a processing means.

The software processed by the one or more processor(s) 1104 can be stored on a transitory computer-readable medium or a non-transitory computer-readable medium. A transitory computer-readable medium includes, for example, a propagating wave or signal, or software itself. A non-transitory computer-readable medium includes any memory of system memory 608 or non-volatile memory 610. Both the transitory computer-readable medium and the non-transitory computer-readable medium are examples of a storing means. A transitory storing means can be distinguished from a non-transitory storing means as described above with regard to the media. These media can store instructions that, when executed, cause the one or more processor(s) to execute the operations described in this disclosure, particularly those described in the algorithms of FIGS. 2A-2B, FIGS. 3A-3B, and FIGS. 7-8. These media can also store the data structures described with reference to FIGS. 4-5 and FIGS. 9-10.

The software processed by the one or more processor(s) 1104 can also be executed after being downloaded and installed. As is known in the case of software on a CD or DVD (e.g., a non-transitory computer-readable medium), the software executed might not be the same as the software downloaded. Thus, a server can store software that, when installed by the device 1100, causes the device to execute the operations of the present disclosure.

Certain example embodiments of the present disclosure can enjoy any number of advantages. For example, a system and a method can perform a make-before-break handover for LTE→WLAN (and vice versa) even when the user device supports only one active RF at a time. In addition, the system and method work for the case when two RF devices are active at the same time and provide for tighter integration even in that case. Performing a make-before-break handover can provide for a more seamless handover.

In certain embodiments, the system and the method can provide for a tighter coupling between the LTE and the WLAN networks, resulting in a LTE-WLAN handover user experience similar to LTE-3G (HSPA+) handover. For LTE→WLAN handover, overhead over the air interface can be kept low by enhancing RRC and not necessarily using an IPsec tunnel from the UE over the air interface. For WLAN-→LTE handover, IEEE802.11 MAC messages can be enhanced for handover preparation phase, and no IPsec tunnel is necessarily established from the UE. Additionally, certain objects can be added in a WLAN beacon that helps to achieve this make-before-handover. Note that any number of 3GPP companies are searching for seamless LTE-WLAN handover solutions as part of 3GPP R12.

Possible Example Modifications for One or More Alternative Implementations

In the description of LTE→WLAN handover described above, the eNodeB notifies the UE of scheduling gaps at S205. In some implementations, such a notification might not be performed. For example, a UE with active concurrent RFs/paths (i.e., one for LTE and another for WiFi) might implement such a modification.

In one embodiment of FIG. 2, the UE can only receive the beacon signal and cannot send a probe request message nor receive the probe response. In another embodiment, the UE can only send the probe request message and receive the probe response and cannot receive the beacon signal. In other embodiments, the UE can receive a beacon signal and can also send a probe request message and receive a probe response. In this last implementation, the UE can determine whether to send the probe request based on previous beacon signals.

As described above, the source-to-target container transmitted from the LTE eNodeB to the MME can include the IP address of the target WLAN AGW. Although the above description considered the case in which the IP address is included in the message received at S210, the IP address can also be determined by the LTE eNodeB based on other information included in the message. Alternatively, another device participating in the forwarding of the source-to-target container (e.g., the MME, a default WLAN AGW, etc.) can determine the IP address. In addition, the LTE eNodeB, the MME, or the default AGW need not actually perform the determination itself and can instead transmit information to another device that actually performs the determination and transmits the IP address back to the LTE eNodeB, the MME, or the default WLAN AGW.

In one example of the WLAN→LTE handover discussed previously, the UE transmits LTE eNodeB parameters to the WLAN AP via an 802.11 MAC message, the WLAN AP sends a handover message to the WLC via enhanced CAPWAP, the WLC sends a handover message to the WLAN AGW via S1-AP-Lite, and the WLAN AGW communicates parameters to the MME. In another implementation, the WLC sends a handover message to the MME, rather than sending a handover message to the WLAN AGW via S1-AP-Lite and the WLAN AGW sending the handover message to the MME.

In the handovers discussed above, it was explained the WLAN AGW keeps mapping information in a database to identify the WLAN AP or the WLC using a MAC address and/or location information of the WLAN AP. Although that database is typically kept in the WLAN AGW, the database can also be located at a different device, in which case the WLAN AGW transmits information to that device, which then replies to the WLAN AGW with the identity of the WLAN AP or the WLC.

With regard to the WLAN→LTE handover, the default MME can be replaced with a database running on a server. When the WLAN AGW transmits the eNodeB ID to the default MME, the server can look up the eNodeB in the database and respond to the WLAN AGW with an identify of the target MME.

Specific bit patterns were provided with respect to, for example, the 802.11 MAC messages sent by the UE to the WLAN AP in a WLAN→LTE handover. These bit patterns were provided by way of example only, and it is specifically contemplated that different bit patterns can be used.

This disclosure was written from the point of view of an acknowledgment-based protocol. The present teachings are not so limited, as it is specifically contemplated that the teachings can be modified to comply with a negative-acknowledgement protocol (or protocols).

The teachings of the present disclosure are applicable to Macro LTE to SP/Enterprise WLAN handover, SP/Enterprise WLAN to Macro LTE handover, small cell LTE to WLAN handover, WLAN to small cell handover, home scenarios, and 3G-WLAN handover, but are no means limited thereto.

Numerous other changes, substitutions, variations, alterations, and modifications can be ascertained by one skilled in the art, and it is intended the present disclosure encompasses all such changes, substitutions, variations, alterations, and modifications as falling within the scope of the appended claims. To assist the United States Patent and Trademark Office (USPTO) and, additionally, any readers of any patent issued on this application in interpreting the claims appended hereto, Applicant wishes to note the Applicant: (a) does not intend any of the appended claims to invoke 35 U.S.C. section 112(f) as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus to provide seamless mobility in a network environment by implementing long-term evolution (LTE) to wireless local area network (WLAN) handover, the apparatus comprising:

an antenna; and
one or more computer processors configured to process data communicated with the antenna, wherein the apparatus is configured to:
subsequent to receiving, in a first wireless network comprising an LTE network, an identification of a scheduling gap, measure a strength of a signal received from an access point in a second wireless network, comprising a WLAN, during the scheduling gap, the scheduling gap comprising a period during which LTE data transmissions are suspended;
subsequent to determining that the measured strength of the signal exceeds a predefined threshold strength, select the access point from a plurality of access points having different measured signal strengths;
subsequent to receiving an indication to start a handover preparation, transmit, via Radio Resource Control (RRC), a request in the LTE network, the request including a first identifier of the selected access point in the WLAN, wherein a tunnel is established to the WLAN, wherein a second identifier of the selected access point is transmitted over the tunnel, wherein the first and second identifiers comprise different identifiers;
receive an association response of the WLAN, that is routed over the LTE network via RRC due to the apparatus having only one active radio frequency (RF) chip at a time, wherein the one active RF chip is tunable to cover two radio access technologies (RATs), wherein the request comprises a first Inter-RAT message, wherein the association response is included in a second Inter-RAT message; and
access the WLAN responsive to receiving the association response and subsequent to performing an authentication for the WLAN via the LTE network.

2. The apparatus of claim 1, wherein the identification is received in an RRC connection reconfiguration message.

3. The apparatus of claim 1, wherein buffered data is forwarded to the WLAN after the second identifier is transmitted in the LTE network.

4. A computer-implemented method to provide seamless mobility in a network environment by implementing long-term evolution (LTE) to wireless local area network (WLAN) handover, the computer-implemented method comprising:

subsequent to receiving, in a first wireless network comprising an LTE network, an identification of a scheduling gap, measuring, by an apparatus, a strength of a signal received from an access point in a second wireless network, comprising a WLAN, during the scheduling gap, the scheduling gap comprising a period during which LTE data transmissions are suspended;
subsequent to determining that the measured strength of the signal exceeds a predefined threshold strength, selecting the access point from a plurality of access points having different measured signal strengths;
subsequent to receiving an indication to start a handover preparation, transmitting, via Radio Resource Control (RRC), a request in the LTE network, the request including a first identifier of the selected access point in the WLAN, wherein a tunnel is established to the WLAN, wherein a second identifier of the selected access point is transmitted over the tunnel, wherein the first and second identifiers comprise different identifiers;
receiving an association response of the WLAN, that is routed over the LTE network via RRC due to the apparatus having only one active radio frequency (RF) chip at a time, wherein the one active RF chip is tunable to cover two radio access technologies (RATs), wherein the request comprises a first Inter-RAT message, wherein the association response is included in a second Inter-RAT message; and accessing the WLAN responsive to receiving the association response and subsequent to performing an authentication for the WLAN via the LTE network by operation of one or more computer processors of the apparatus.

5. The computer-implemented method of claim 4, wherein the tunnel is established to a first device in the WLAN, wherein buffered data is forwarded to the WLAN after the second identifier is transmitted in the LTE network, wherein a network address of the first device in the WLAN is received, wherein the network address comprises an Internet Protocol (IP) address, wherein the identification is received in an RRC connection reconfiguration message, wherein the association response includes the second identifier of the selected access point, wherein the second identifier is transmitted in the LTE network.

6. The computer-implemented method of claim 5, wherein the computer-implemented method further comprises:

receiving, in respective instances during the scheduling gap, a predefined message selected from each of: (i) a beacon signal and (ii) a probe response message;

wherein each of the beacon signal and the probe response message includes a timestamp field, a beacon interval field, and a set of vendor-specific extension fields, the set of vendor-specific extension fields including: (i) a WLAN access point (AP) location field; (ii) a WLAN AP MAC address field containing any WLAN AP MAC address that differs from a basic service set identifier (BSS ID) used in a 802.11 MAC frame header; (iii) a WLAN access gateway (AG) IP address field; and (iv) a wireless LAN controller (WLC) network address field;

wherein the beacon signal further includes a quality-of-service capability field; wherein the probe response message further includes an Enhanced Distributed Channel Access (EDCA) parameter set field and a requested information elements field, wherein the probe response message is received in response to a probe request message.

7. The computer-implemented method of claim 6, further comprising performing an operation to implement WLAN to LTE handover, the operation comprising:

receiving, in the WLAN, an identifier of a base station in the LTE network;

contacting a second device in the LTE network via a second tunnel;

receiving an identity of a third device in the LTE network; establishing a third tunnel with the third device;

transmitting, using a specified protocol and the third tunnel, the identifier of the base station to the LTE network;

receiving, using the third tunnel, a first indication whether a handover from the WLAN to the LTE network is accepted; and transmitting a second indication in the WLAN that the handover is accepted.

8. The computer-implemented method of claim 7, wherein the identifier of the base station is received, by a WLAN access gateway and from a user equipment (UE), in a first 802.11 media access control (MAC) message including a frame control field having (i) a type set to 01 and (ii) a subtype set to 0000;

wherein the first indication comprises an acknowledgement message, the acknowledgment message comprising a second 802.11 MAC message including a frame control field having (i) a type set to 01 and (ii) a subtype set to 0001.

9. The computer-implemented method of claim 8, wherein the second indication comprises a third 802.11 MAC message including a frame control field having (i) a type set to 01 and (ii) a subtype set to 0010;

wherein each 802.11 MAC message has a format that includes a frame control field of two bytes, a duration identifier field of two bytes, a destination address field of six bytes, a source address field of six bytes, a basic service set identifier field of six bytes, a sequence control field of two bytes, an address field of six bytes, a quality of service control field of two bytes, a frame body, and frame check sequence field of four bytes.

10. The computer-implemented method of claim 9, wherein the sequence control field facilitates identifying message ordering and removing duplicate frames, wherein the frame body is between zero and 2,312 bytes;

wherein the frame control field includes a protocol version field of two bits, a type field of two bits, a subtype field of four bits, a to-distribution-system field of one bit, a from-distribution-system field of one bit, a more-fragments field of one bit, a retry field of one-bit, a power management field of one bit, a more-data field of one bit, a protected-frame field of one bit, and an order field of one bit.

11. The computer-implemented method of claim 10, wherein the specified protocol is based on S1 Application Protocol (S1-AP), wherein the first indication includes a RACH preamble, wherein the second device comprises a default mobility management entity, wherein the third device comprises a target mobility management entity distinct from the default mobility management entity.

12. The computer-implemented method of claim 11, further comprising:

determining an identity of the second device based at least in part on, in respective instances: (i) the identifier of the base station, and a device location in the WLAN; and (ii) database mapping information;

transmitting to the third device a Quality of Service (QoS) parameter of a session in the WLAN;

stopping a transmission of data in the WLAN after the transmitting the second indication; and transmitting to the third device using an LTE_WLAN Handover (LWH) interface.

13. The computer-implemented method of claim 4, wherein the identification is received in an RRC connection reconfiguration message.

14. The computer-implemented method of claim 4, wherein buffered data is forwarded to the WLAN after the second identifier is transmitted in the LTE network.

15. The computer-implemented method of claim 4, wherein the association response includes the second identifier of the selected access point, wherein the second identifier is transmitted in the LTE network.

16. One or more non-transitory computer-readable media encoded with software comprising computer executable instructions executable to perform an operation to provide seamless mobility in a network environment by implementing long-term evolution (LTE) to wireless local area network (WLAN) handover, the operation comprising:

subsequent to receiving, in a first wireless network comprising an LTE network, an identification of a scheduling gap, measuring, by an apparatus, a strength of a signal received from an access point in a second wireless network, comprising a WLAN, during the scheduling gap, the scheduling gap comprising a period during which LTE data transmissions are suspended;

subsequent to determining that the measured strength of the signal exceeds a predefined threshold strength, selecting the access point from a plurality of access points having different measured signal strengths;

subsequent to receiving an indication to start a handover preparation, transmitting, via Radio Resource Control (RRC), a request in the LTE network, the request including a first identifier of the selected access point in the WLAN, wherein a tunnel is established to the WLAN, wherein a second identifier of the selected access point is transmitted over the tunnel, wherein the first and second identifiers comprise different identifiers;

receiving an association response of the second wireless network, that is routed over the LTE network via RRC due to the apparatus having only one active radio frequency (RF) chip at a time, wherein the one active RF chip is tunable to cover two radio access technologies (RATs), wherein the request comprises a first Inter-RAT message, wherein the association response is included in a second Inter-RAT message; and accessing the WLAN responsive to receiving the association response and subsequent to performing an authentication for the WLAN via the LTE network by operation of one or more computer processors of the apparatus when executing the instructions.

17. The one or more non-transitory computer-readable media of claim 16, wherein the identification is received in an RRC connection reconfiguration message.

18. The one or more non-transitory computer-readable media of claim 16, wherein buffered data is forwarded to the WLAN after the second identifier is transmitted in the LTE network.

* * * * *

UNITED STATES PATENT AND TRADEMARK OFFICE
CERTIFICATE OF CORRECTION

PATENT NO. : 10,440,619 B2
APPLICATION NO. : 15/222465
DATED : October 8, 2019
INVENTOR(S) : Mukesh Taneja et al.

Page 1 of 1

It is certified that error appears in the above-identified patent and that said Letters Patent is hereby corrected as shown below:

On the Title Page

On the page 2, in Column 2, item (56), under "Other Publications", Line 33, delete "/tsh_" and insert -- /tsg_ --, therefor.

On the page 3, in Column 2, item (56), under "Other Publications", Line 14, delete "LTD;" and insert -- LTE; --, therefor.

In the Drawings

On sheet 4 of 11, in Figure 3A, Line 14, delete "ID,QoS" and insert -- ID, QoS --, therefor.

In the Specification

In Column 2, Line 5, delete "LTE->" and insert -- LTE→ --, therefor.

In Column 2, Line 7, delete "LTE->" and insert -- LTE→ --, therefor.

In Column 3, Line 45, delete "T523.402)." and insert -- TS23.402). --, therefor.

In Column 5, Line 64, delete "T536.413" and insert -- TS36.413 --, therefor.

In Column 6, Line 26, delete "UE" and insert -- UE- --, therefor.

Signed and Sealed this
Third Day of March, 2020

Andrei Iancu
*Director of the United States Patent and Trademark Office*